Aug. 19, 1941.　　　D. P. LOYE ET AL　　　2,253,186
SOUND CHARACTERISTIC CONTROL
Filed April 13, 1939　　　3 Sheets-Sheet 1
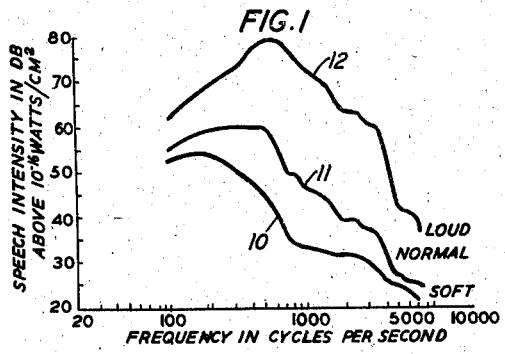
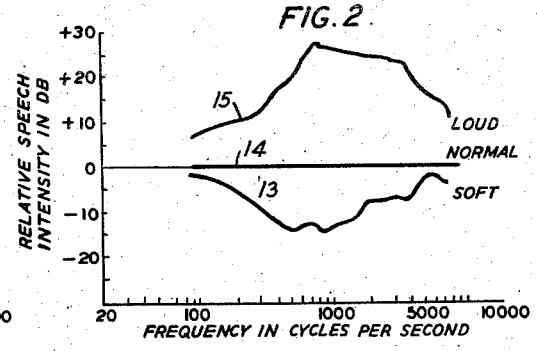
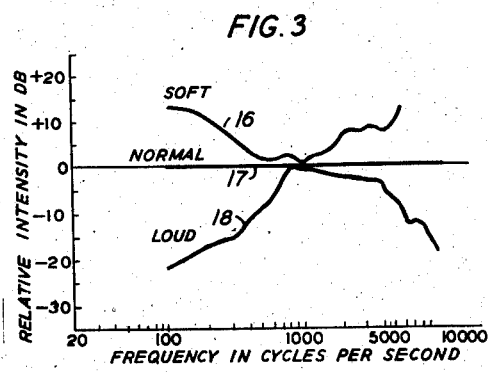
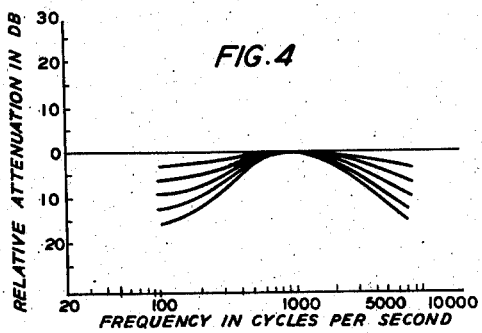
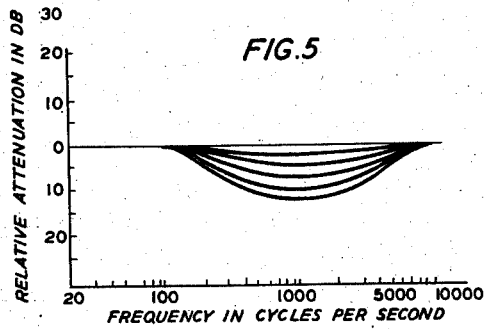
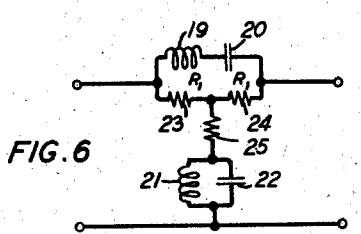
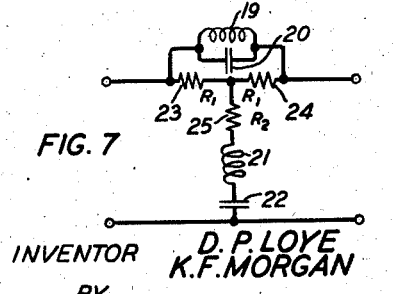
INVENTOR　D. P. LOYE
　　　　　　K. F. MORGAN
BY
ATTORNEY Aug. 19, 1941.  D. P. LOYE ET AL  2,253,186
SOUND CHARACTERISTIC CONTROL
Filed April 13, 1939  3 Sheets-Sheet 2

INVENTORS: D. P. LOYE
K. F. MORGAN
BY
ATTORNEY

Aug. 19, 1941.   D. P. LOYE ET AL   2,253,186
SOUND CHARACTERISTIC CONTROL
Filed April 13, 1939     3 Sheets-Sheet 3

INVENTORS: D. P. LOYE
K. F. MORGAN

ATTORNEY

Patented Aug. 19, 1941

2,253,186

UNITED STATES PATENT OFFICE 2,253,186

SOUND CHARACTERISTIC CONTROL

Donald P. Loye, Beverly Hills, and Kenneth F. Morgan, Los Angeles, Calif., assignors to Electrical Research Products, Inc., New York, N. Y., a corporation of Delaware Application April 13, 1939, Serial No. 267,544

6 Claims. (Cl. 179—1)

This invention relates to sound reproduction, and particularly to a method and means for controlling and modifying those electrical characteristics of sound currents which determine the quality of the reproduced sound. It is a particular object of the invention to provide a method and means for causing the reproduced quality of sounds produced at a certain energy level to simulate to the ear of a listener the quality which those same sounds would have if they had been produced at a different energy level. This object is attained by what may be termed voice effort equalization.

The invention may be applied to attain this object in various connections. In the particular embodiment herein disclosed it is utilized in connection with the recording and reproduction of speech for talking motion pictures. Voice effort equalization is introduced in such a manner as to cause the voice quality characteristic as heard by the listener in the theatre to create in the listener's mind the illusion of reality in the pictured action he is viewing.

The relative distribution of energy over the frequency range or spectrum changes with voice effort; that is, it changes with the effort involved as the voice increases or decreases in loudness. The soft speaking voice is relatively richer in the lower and higher frequencies, as compared with the intermediate frequencies, than the normal or conversational voice; and the loud or declamatory voice, in turn, has relatively less of the lower and higher frequencies, as compared with the intermediate frequencies, than the normal or conversational voice. These frequency distribution patterns, or voice quality characteristics peculiar to the various degrees of effort of the speaking voice, are instinctively recognized by the listener in the theatre when the sound picture is reproduced; and if the pattern is not that of the speaking voice which would be the natural voice in the environment in which the scene appears to be taking place, the illusion of reality is impaired.

As a result of the sound recording stage being acoustically relatively dead, and extraneous noises which customarily determine a speaker's speaking effort being ordinarily entirely absent, the actors on the recording stage tend to speak at a voice level that is considerably lower or softer than the level to which they would raise their voices in the environment in which they seem, to the theatre listener, to be speaking. This means that, in the quietness of the recording stage, they are inclined to speak at a low voice level where the frequencies in the lower part as well as the frequencies in the upper part of the frequency spectrum are of a relatively greater energy, as compared with those in the intermediate part of the range, than they would be if the actors were speaking at the greater loudness level that their apparent environment seems to require. To alter the frequency energy distribution over the range to the different pattern characteristic of the normal energy distribution of frequencies for the louder volume that seems natural in the environment, and thus produce the illusion of reality, the relative distribution is reshaped, in accordance with this invention, by a predetermined relative equalization of the energy levels of the lower and upper frequencies with respect to the intermediate frequencies of the range.

If, on the other hand, it should be desirable to cause speech delivered at a declamatory level to simulate the speech as it would have sounded if it had been spoken at a normal or conversational level, this, in accordance with the invention, is done by a predetermined relative degree of energy equalization of the middle with respect to the lower and upper portions of the frequency range to produce an energy distribution pattern similar to the pattern characteristic of the normal or conversational speaking voice.

The amount of energy equalization for the various frequencies over the range is determined by the difference in contour between the frequency energy distribution characteristic corresponding to the voice level used and that corresponding to the voice level that is to be simulated. The manner in which this is accomplished will be more clearly understood by reference to the following description taken in connection with the accompanying drawings, in which:

Fig. 1 shows average characteristic curves of the soft, normal and loud voice;

Fig. 2 shows the intensity distribution of the average voice characteristics plotted relative to normal speech intensity;

Fig. 3 shows the amount by which the soft voice and loud voice characteristics would have to be equalized to produce the normal voice characteristic;

Fig. 4 shows the attenuation characteristics appropriate for various degrees of voice effort equalization to cause a soft voice pattern approximately to simulate the pattern of the voice produced at progressively increasing energy levels;

Fig. 5 shows the attenuation characteristics for various degrees of voice effort equalization to cause a loud voice pattern to simulate the pattern of the voice produced at progressively decreasing energy levels;

Fig. 6 shows a type of network which may be used to produce the attenuation characteristics of Fig. 4;

Fig. 7 shows a type of network which may be used to produce the attenuation characteristics of Fig. 5;

Figure 8:
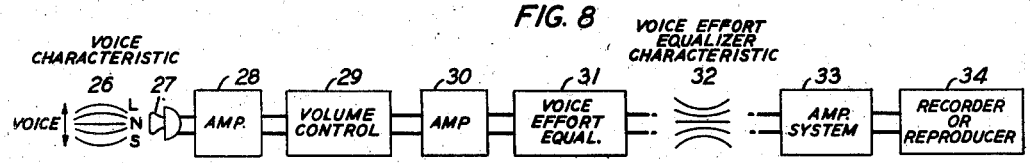
Fig. 8 shows schematically a sound recording or sound reproducing system equipped for voice effort equalization.

The equalization of the voice quality at one energy level to simulate the voice quality at a different energy level is based upon measurements which we have made of the average speaking voice characteristics of a group of people including both men and women. The results of these measurements are illustrated in the curves shown in Fig. 1. In the coordinate chart of this figure the abscissa represents sound frequency in cycles per second and the ordinate represents speech intensity in decibels above $10^{-16}$ watts per square centimeter. The three curves 10, 11 and 12 show, respectively, the distribution of speech intensity over the frequency spectrum for the soft or confidential voice, the normal or conversational voice, and the loud or declamatory voice. The average intensity over the whole spectrum, as shown during the tests by a sound level meter, was +55 decibels for the soft voice, +66 decibels for the normal voice and +84 decibels for the loud voice. The microphone was placed at a distance of one foot from the speaker. The tests indicated that the energy distribution pattern over the spectrum does not change substantially when the microphone is placed at a greater distance from the speaker. The curves of Fig. 1 show that as the energy level of the voice is increased, the speech intensities in all parts of the frequency spectrum are raised; but that the increase in intensity in the middle frequencies of the range is relatively very considerably greater than in the lower and upper parts of the range.

In order to make the change in speech quality with change in speaking effort more evident, the soft or confidential and the loud or declamatory speech relative intensity magnitudes are shown in Fig. 2 plotted as curves 13 and 15 departing from the normal or conversational speech intensity magnitudes indicated as a straight line 14. It is apparent from an inspection of this chart that, as compared with normal speech intensity distribution, in the case of soft speech shown by curve 13 the relative intensities are increasingly greater from the middle frequency toward both the low frequency and the high frequency end of the spectrum; and that in the case of loud speech shown by curve 15 the relative intensities are increasingly less from the middle frequency toward both the low frequency and the high frequency end of the spectrum.

In Fig. 3 a third set of curves is shown somewhat similar to the set of curves in Fig. 2, excepting that the reference line 17 is displaced to pass through the minimum energy point of the soft voice curve 16 and through the maximum energy point of the loud voice curve 18. These curves represent the amounts by which the speech energy should be altered at various frequencies in order to change one type of speech energy distribution to another. With the normal or conversational voice intensity magnitudes represented by the straight reference line 17, it may be seen that to change from the soft voice characteristic 16 to the normal characteristic 17 requires a progressive attenuation relative to the 1000 cycle value, reaching about thirteen decibels at a frequency of 100 cycles per second and reaching about the same amount at 5000 cycles per second; and that to change from the loud voice characteristic 18 to the normal characteristic 17 requires a progressive amplification relative to the 1000 cycle value which reaches about twenty-one decibels at 100 cycles and about nine decibels at 5000 cycles.

It is apparent from the foregoing that reproduced speech, at whatever level spoken when equalized to have generally the differential energy distribution pattern as compared with normal speech represented for example by the curve 16 lying above the normal speech reference line of Fig. 3 will sound to the listener approximately like speech spoken in a soft or confidential tone of voice; and that reproduced speech, at whatever level spoken, when equalized to have the differential energy distribution pattern with reference to normal speech represented for example by the curve 18 lying below the normal line of Fig. 3 will sound to the listener approximately like speech spoken in a loud or declamatory tone of voice.

These quantitative peculiarities of the speaking voice with respect to energy distribution over the frequency spectrum serve, in accordance with the invention, as the basis for the introduction into the speech current circuit of equalization which, by proper proportioning over the frequency range, may be utilized as desired to modify the energy distribution pattern of the transmitted voice currents so as to cause the reproduced speech to sound to the ear of the listener approximately like speech delivered to the microphone at a voice energy level or effort either greater or less than that actually used by the speaker. By the introduction of such properly designed equalization into the circuit, together with appropriate flat characteristic gains or losses, the speech, at whatever energy level it is spoken and delivered to the microphone, may be caused approximately to simulate the characteristic pattern of, and be heard as though it had been spoken at, any other arbitrarily selected energy level.

Thus, if, in the case of a talking motion picture, the actor on account of the acoustic deadness and quietness of the recording stage speaks in a low or confidential tone of voice where the pictured action seems to require a normal or loud tone, the recording mixing operator may introduce the predetermined equalization into the circuit that will cause the frequency energy distribution pattern to be changed and simulate in its general contour the characteristic pattern produced by a normal speech level or by a declamatory speech level. Similarly, if the actor speaks in a louder tone of voice than the pictured environment seems to require, the mixing recording operator may introduce such predetermined equalization over the frequency range as to cause the pattern of the transmitted speech currents to correspond with the pattern of such lower voice effort energy level as is judged to be correct for the pictured environment. This same procedure may also obviously be employed by the mixing operator in the rerecording of dialogue which has been delivered on the recording stage and recorded at a different level from that which seems to be proper to those who supervise the mixing and rerecording of the sound components that go to make up the complete sound picture.

The equalization required to be introduced to cause one voice quality characteristic or pattern to simulate any other pattern may be determined from the energy distribution curves as they are variously illustrated in Figs. 1, 2 and 3. To change the pattern from soft to normal, or normal to loud, or soft to loud requires the introduction of selective attenuation that progressively increases from the intermediate portion of the frequency range at about 1000 cycles toward both ends, the slope of the curve becoming steeper as the difference in energy level between the actual voice and the voice to be simulated increases. To change the pattern from loud to normal, or normal to soft, or loud to soft the form of the attenuation curve is one which has maximum attenuation in the intermediate frequency range and decreases progressively toward both ends of the frequency spectrum. Fig. 4 illustrates a family of attenuation curves adapted for voice effort equalization when it is desired to cause the pattern of the soft voice to simulate the pattern of the voice produced at progressively increasing energy levels; and Fig. 5 illustrates a family of attenuation curves which may be employed for voice effort equalization when it is desired to cause the pattern of the loud voice to simulate the voice at any lower energy level.

For the production of the type of attenuation shown in either of the above-mentioned families of curves the constant resistance bridged-T type of network may conveniently be used. Networks of this type are well known and commonly used in the art, and their characteristics and data for their design are described in many publications. A close approximation to the attenuation characteristics of the family of curves illustrated in Figs. 4 and 5 may be obtained by the use of single section networks of the form shown in Figs. 6 and 7, respectively. In each of the networks of Figs. 6 and 7 the reactance elements 19, 20, 21 and 22 may be fixed, while the resistance elements 23, 24 and 25 may be adjustable to vary the amount of attenuation and the slope of the attenuation curve to the extent necessary to change one voice quality characteristic into another.

A block schematic of a system utilizing the invention is illustrated in Fig. 8. The double-headed arrow at the left end of the schematic symbolizes the increasing or decreasing voice effort. The change in voice effort causes a change in energy distribution over the frequency range as conventionally indicated at 26, the differential contours S, N and L being generally those for soft, normal and loud voice as indicated in Fig. 2. The voice energy is picked up by the microphone 27 and is amplified in the amplifier 28. The volume of the amplifier output is adjusted by means of the volume controlling device 29, and the output at the desired energy level is delivered to the amplifier 30. The amplifier 30 works into the voice effort equalizer 31, which is arranged to include in the circuit, when equalization is desired, one or the other of the equalizing networks of Figs. 6 and 7 together with flat characteristic attenuating pads variable with the equalizer characteristic changes to maintain constant average loss over the frequency range irrespective of the kind and degree of the equalization changes. The various kinds and degree of energy distribution change over the spectrum which may be introduced under the control of the voice effort equalizer are conventionally illustrated at 32, and have contours the reverse of the voice effort characteristics shown at 26 which they are designed to equalize. The voice currents after equalization are delivered to the amplifier system 33, and thence pass to the device 34, which may be a recorder in the case of a talking motion picture recording system, or a reproducer in case the voice currents are to be immediately reconverted into sound.

Figure 9:
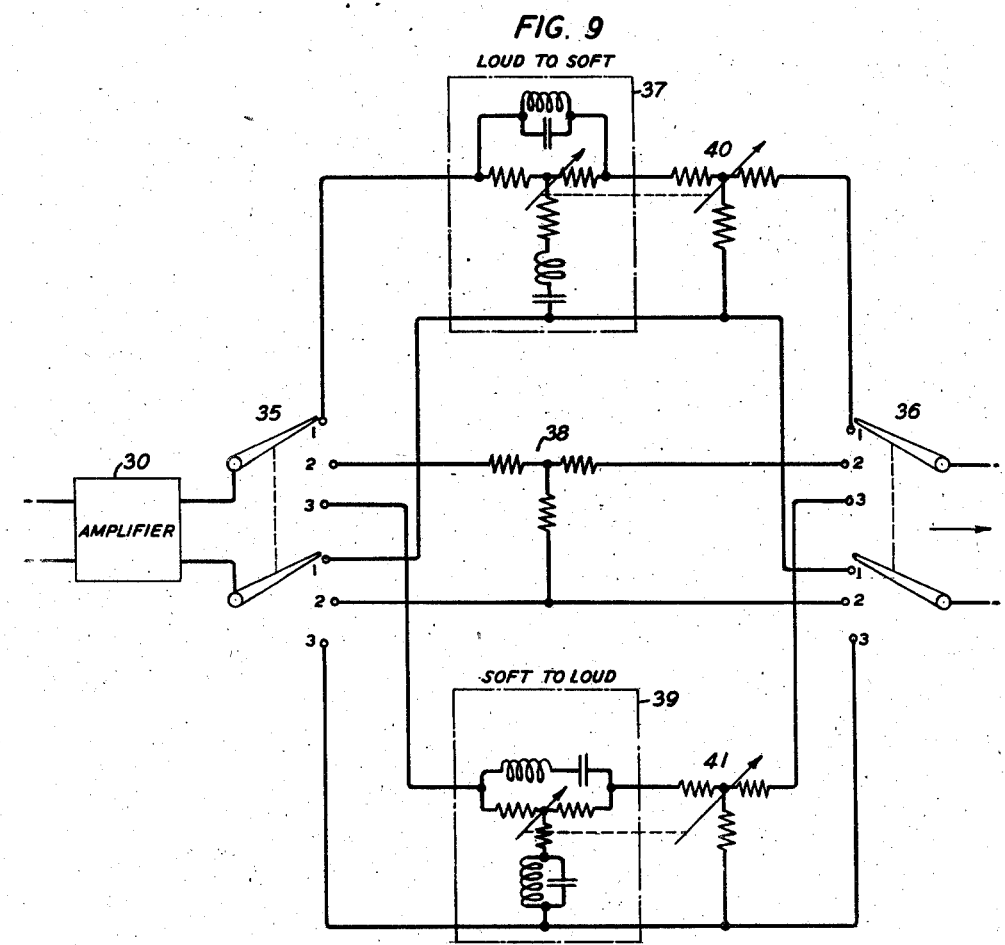
Fig. 9 shows diagrammatically a circuit which may be employed for introducing and controlling voice effort equalization in a system such as that of Fig. 8.

A circuit arrangement which may conveniently be employed as the voice effort equalizer 31 of Fig. 8 is schematically illustrated in Fig. 9. Two double-pole, three-position switches 35 and 36 serve to connect the input from amplifier 30 and the output to amplifier system 33 alternatively with either the equalizing network 37, the constant loss attenuator 38 or the equalizing network 39. When no equalization for voice effort is required, both switches 35 and 36 rest in mid-position. When equalization is desired to transform the voice quality characteristic or pattern to that of the voice quality characteristic at a lower energy level, the switches 35 and 36 are thrown to their upper positions, as shown on the diagram. When equalization is desired to transform the voice quality characteristic or pattern to that of the voice quality characteristic at a higher energy level, the switches are thrown to their lowermost position, as indicated on the diagram.

Associated with each of the voice effort equalizers 37 and 39 are flat characteristic attenuating pads 40 and 41, respectively. As has been stated, the resistance elements of the equalizing networks 37 and 39 are adjustable to alter the amount of equalization introduced by each network; and the associated attenuationg pads 40 and 41, respectively, are also adjustable and are coupled with the controls of their associated equalizing networks 37 and 39, so that as each equalizer is adjusted to control the equalization which it introduces the corresponding pad is also adjusted to keep the average loss over the frequency range in the corresponding equalizing branch constant and equal to the average loss which is represented by the fixed attenuating pad 38.

Figure 10:
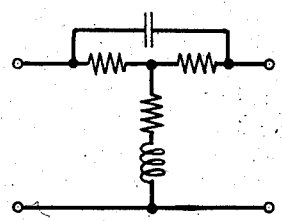
Fig. 10 shows a type of network for producing attenuation increasing toward the low frequency end of a frequency band.
Figure 11:
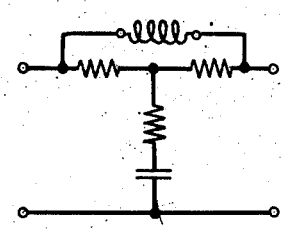
Fig. 11 shows a type of network for producing attenuation increasing toward the high frequency end of a frequency band.

If, instead of introducing all of the voice effort equalization at a particular point in the circuit by means of an equalizing network of one or the other of the types illustrated in Figs. 6 and 7, it should be desired to equalize over only a selected portion of the frequency range at one point and over the balance of the frequency range at another point, this may be done by employing, for example, the constant impedance bridged-T type network of the sort illustrated in Figs. 10 and 11. The network shown in Fig. 10 gives an attenuation characteristic of the type shown in the curves of Figs. 12 and 15; and the network illustrated in Fig. 11 gives an attenuation characteristic of the type illustrated in the curves of Figs. 13 and 14.

Figure 12:
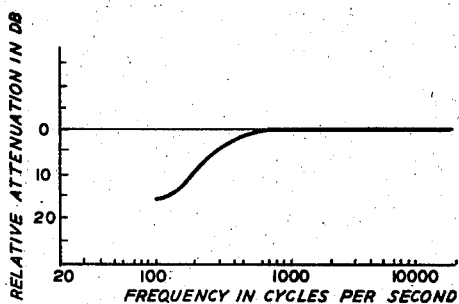
Figs. 12 and 15 show the sort of attenuation characteristic produced by the type of network illustrated in Fig. 10, differently located in the frequency spectrum.
Figure 14:
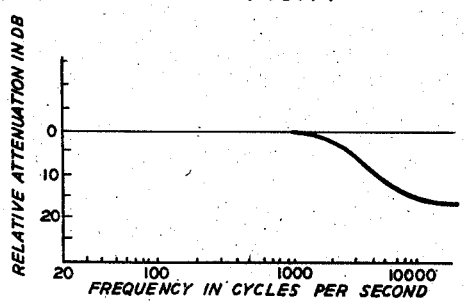
Figure 15:
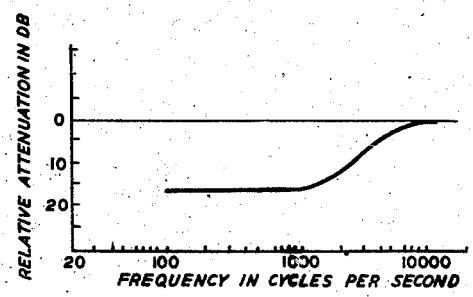

By properly choosing the values of the elements in the network of Figs. 10 and 11 the points of minimum and maximum attenuation may be placed at any desired point in the frequency spectrum. To produce an over-all characteristic in the transmission line approximating the attenuation curves of Fig. 4, the values of the elements of the networks of Figs. 10 and 11, included serially in the circuit are so chosen that the network of Fig. 10 reaches its maximum attenuation at a frequency of about 100 cycles and its minimum attenuation at slightly below 1000 cycles as shown in Fig. 12; and the network of Fig. 11 reaches its minimum attenuation at slightly above 1000 cycles and its maximum attenuation at about 8000 cycles, as shown in Fig. 14. To produce an over-all attenuation characteristic in the line approximating the attenuation curves of Fig. 5, the values of the elements of the networks of Figs. 10 and 11, included serially in the circuit are so chosen that the network of Fig. 11 reaches its minimum attenuation at a frequency of about 100 cycles and its maximum attenuation at slightly below 1000 cycles, as shown in Fig. 13; and the network of Fig. 10 reaches its maximum attenuation at slightly above 1000 cycles and its minimum attenuation at about 8000 cycles, as shown in Fig. 15.

Figure 13:
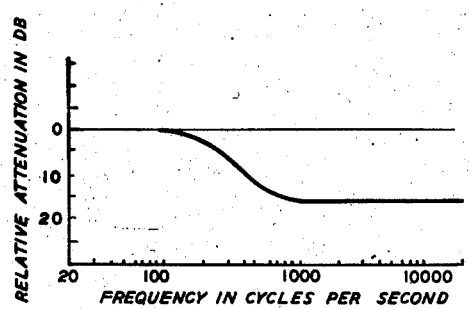
Figs. 13 and 14 show the sort of attenuation characteristic produced by the type of network illustrated in Fig. 11, differently located in the frequency spectrum.

When the equalizing network of Fig. 11 with the values of its elements so chosen as to give the attenuation characteristic of Fig. 13 is substituted for the network 37 of Fig. 9 and the network of Fig. 10 with the values of its elements so chosen as to give the attenuation characteristic of Fig. 12 is substituted for the network 39 of Fig. 9, then, with the coupled adjustments of networks and associated attenuating pads as shown in Fig. 9, the arrangement provides for controlled voice effort equalization in the lower to intermediate portion of the frequency spectrum.

It is obvious that voice effort equalization such as has been described may be employed in the rerecording as well as in the original recording of the voice. By including voice effort equalizing controls at the rerecording mixing board, the mixing operator may conveniently alter the dialogue that is being reproduced from the original recording to change not only its level but its quality characteristic in accordance with the level and characteristic which seems to be best adapted to give the desired effect in the composite recording.

What is claimed is:

1. The method of causing the quality of sound produced by a living organism at a certain energy level to simulate the quality of the same sound if it had been produced at a different energy level, which consists in converting the sound into correspondingly varying electrical currents, selectively equalizing the currents over a selected portion of the frequency range to cause the relative energy distribution over said portion to approximate the relative distribution that would have existed if the same sound had been produced at the different energy level, and reconverting the resultant equalized electrical variations into sound.

2. The method of causing the quality of speech spoken at a certain energy level to simulate the quality of the same speech if it had been spoken at a higher energy level, which consists in converting the speech into correspondingly varying electrical currents, selectively equalizing the currents over the frequency range to cause the relative energy distribution over the range to approximate the relative distribution that would have existed if the same speech had been produced at a higher energy level, and reconverting the resultant equalized electrical variations into sound.

3. The method of causing the quality of speech spoken at a certain energy level to simulate the quality of the same speech if it had been spoken at a lower energy level, which consists in converting the speech into correspondingly varying electrical currents, selectively equalizing the currents over the frequency range to cause the relative energy distribution over the range to approximate the relative distribution that would have existed if the same speech had been produced at the lower energy level, and reconverting the resultant equalized electrical variations into sound.

4. A sound recording system comprising a microphone, a sound recorder, an electric circuit connecting the microphone and recorder, and an equalizer included in said circuit, said equalizer being constructed to have a plurality of selectable equalization characteristics differing one from another, each of said equalization characteristics being adapted when included in the circuit to cause the pattern of the transmitted energy distribution over a portion of the frequency range to approximate the distribution pattern over said portion of a different predetermined sound energy loudness level at the microphone.

5. A sound recording system for causing the quality of speech spoken at a certain energy level to simulate the quality of the same speech if it had been spoken at any one of a plurality of higher energy levels, comprising a microphone, a sound recorder, an electric circuit connecting the microphone and recorder, and equalizing means included in said circuit, said equalizing means being constructed to have a plurality of selectable equalization characteristics differing one from another, each of said equalization characteristics being adapted when included in the circuit to cause the pattern of the transmitted speech energy distribution over the frequency range to approximate the distribution pattern that would have been produced if the speech had been spoken at a selected one of the plurality of higher energy levels.

6. A sound recording system for causing the quality of speech spoken at a certain energy level to simulate the quality of the same speech if it had been spoken at any one of a plurality of lower energy levels, comprising a microphone, a sound recorder, an electric circuit connecting the microphone and recorder, and equalizing means included in said circuit, said equalizing means being constructed to have a plurality of selectable equalization characteristics differing one from another, each of said equalization characteristics being adapted when included in the circuit to cause the pattern of the transmitted speech energy distribution over the frequency range to approximate the distribution pattern that would have been produced if the speech had been spoken at a selected one of the plurality of lower energy levels.

DONALD P. LOYE.
KENNETH F. MORGAN.